United States Patent [19]

Steyer et al.

[11] 4,295,332
[45] Oct. 20, 1981

[54] INFRARED SUPPRESSOR SYSTEM

[75] Inventors: William Steyer, Ipswich; Robert J. Duffy, Boxford, both of Mass.

[73] Assignee: General Electric Company, Lynn, Mass.

[21] Appl. No.: 960,351

[22] Filed: Nov. 13, 1978

[51] Int. Cl.³ ............................ F02K 3/00; F02K 7/00
[52] U.S. Cl. .................................. 60/264; 239/265.17; 239/127.3
[58] Field of Search .................................. 60/39.5, 264; 239/265.13, 265.17, 127.3; 181/222, 224, 220, 213; 250/504, 514

[56] References Cited

U.S. PATENT DOCUMENTS 4,007,587  2/1977  Banthin et al. ..................... 60/39.5
4,136,518  1/1979  Hurley et al. ........................ 60/264

Primary Examiner—Carlton R. Croyle
Assistant Examiner—Rae Cronmiller
Attorney, Agent, or Firm—Henry J. Policinski; Derek P. Lawrence; Donald W. Walk

[57] ABSTRACT

An infrared suppressor system for gas turbine engine is provided for suppressing infrared radiation associated with the hot metal parts of the engine and with the hot exhaust gases exhausted from the engine.

15 Claims, 4 Drawing Figures

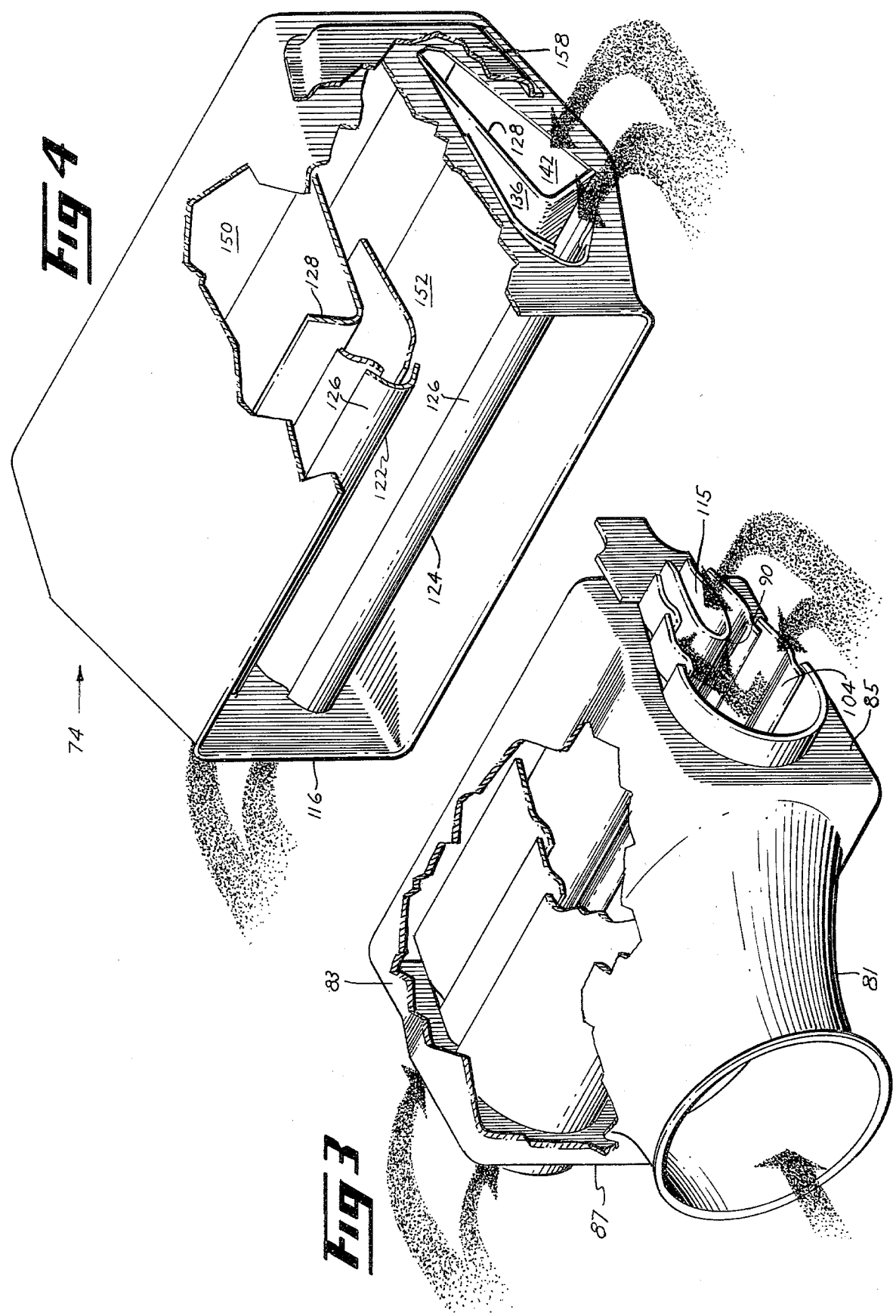

INFRARED SUPPRESSOR SYSTEM

BACKGROUND OF THE INVENTION

This invention relates to an infrared suppression system for a gas turbine engine, and more specifically to an infrared suppressor system which blocks the line of sight into the engine and which provides for mixing of cooling air with the hot exhaust gases of the engine.

With recent advancements in weapons detection technology, there is growing recognition, in the field, of the importance of reducing the infrared signature associated with gas turbine engines powering military aircraft. Signature reductions reduce the possibility of detection and pursuit by enemy anti-aircraft forces including heat-seeking missiles. In the past, various apparatus have been utilized to suppress infrared radiation from gas turbine engines. Generally, these prior art devices admit to two catagories; one in which a center plug is disposed in the exhaust flow and cooperates to block the line of sight to the hot turbine parts of the engine; and the other of which blocks line of sight by ejecting the hot gases from the suppressor at substantial angle from the axial center line of the engine.

Prior art suppressors of the type just mentioned have been numerous. However, none of these prior art suppressors have been found to be entirely satisfactory in suppressing the levels of infrared radiation associated with advanced gas turbine engines. Improvements are necessary over these prior art suppressors to overcome the advances in detection technology.

It is a primary object of the present invention to provide an improved infrared radiation suppressor system for a gas turbine engine.

It is another object of the present invention to provide an infrared radiation suppressor which obstructs the line of sight of the hot turbine parts of the engine with reduced performance losses of the engine with the suppressor installed.

It is yet another object of the present invention to provide an infrared radiation suppressor which suppresses infrared radiation emitted from secondary sources associated with the suppressor.

It is still another object of the present invention to provide an infrared suppressor which provides complete and thorough mixing of hot exhaust gases with cooler ambient air to effect a reduction in the signature of the exhaust plume.

SUMMARY OF THE INVENTION

Briefly stated, these and other objects of the present invention which will become apparent from the following detailed description and accompanying drawings are accomplished by the present invention which, in one form, provides an apparatus for suppressing infrared radiation emitted from the hot metal parts at the aft end of a gas turbine engine and from the stream of exhaust gases flowing therefrom during operation of the engine. More specifically, the present invention provides duct means adapted to receive the stream of hot gases from the engine and to confine the exhaust gases to flow through the duct. First splitter means are disposed within the duct means for splitting the gas stream into first and second flowing gas streams. Second splitter means are also disposed in the duct means but are positioned downstream of the first splitter means for splitting each of the first and second gas streams. The first and second splitter means cooperate to obstruct line of sight viewing of the hot metal parts when the engine is viewed from the aft direction. The first splitter means may be comprised of first and second spaced apart wall members, the first of which is directly exposed to infrared radiation emitted by the hot turbine engine parts and the second of which is disposed downstream of the first wall member to obstruct the line of sight viewing of the first wall member when the engine is viewed from the aft direction. The spacing between said first and second wall members may define a first flow channel adapted to provide for cooling of said first wall member with cooling air. Similarly, the second splitter means may be comprised of an upstream wall member spaced apart from a downstream wall member. The upstream wall member is directly exposed to infrared radiation emitted by the hot turbine parts while the downstream wall member obstructs the line of sight viewing of the upstream wall member when the engine is viewed from the aft direction. The spacing between the upstream and downstream wall members may define a second flow channel adapted to provide for cooling of said upstream wall member with cooling air. The apparatus may include mixing means for mixing the hot exhaust gases received from the engine with cooling air to reduce the temperature of the gases exiting the engine.

DESCRIPTION OF THE DRAWINGS

While the specification concludes with claims particularly pointing out and distinctly claiming the present invention, the invention will be more readily understood from the following description of the preferred embodiments which are given by way of example with the accompanying drawings in which:

FIG. 3 depicts a perspective partial cutaway view of the first stage of the suppressor comprising the present invention.

FIG. 4 depicts a perspective partial cutaway view of the second stage of the suppressor comprising the present invention.

DESCRIPTION OF THE PREFERRED EMBODIMENT

Figure 1:
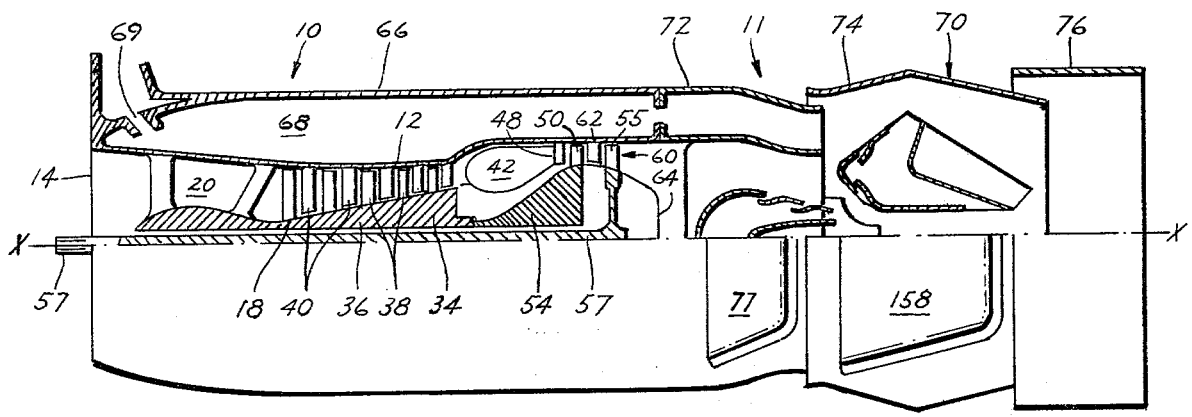
FIG. 1 depicts cross-sectional schematic view of a typical gas turbine engine shown in combination with the suppressor comprising the present invention.

Referring now to FIG. 1, there is shown a cross-sectional schematic representation of a gas turbine engine depicted generally at 10 in combination with the infrared suppressor of the present invention depicted generally at 11. Gas turbine engine 10 includes an outer casing 12 open at the upstream end to provide an airflow inlet 14. An annular passageway 20, defined by casing 12 and inner fairing 18, extends axially to the aft end of engine 10. Air entering inlet 14 flows along annular passageway 20 sequentially through compressor 34 comprising a rotor 36 from which extend a plurality of axially spaced apart rows of rotor blades 38 interspaced between axially spaced apart rows of stator vanes 40. Pressurized air is discharged from the compressor 34 into a combustion chamber 42 where it is mixed with fuel and burned to produce a high energy hot gas stream which exits from the combustor through a nozzle diaphragm assembly 48.

The high energy gas stream, which may have a temperature in excess of 2400° F. then drives a high pressure turbine 50 which connects to the compressor rotor 36 through a shaft 54. The high energy gas stream is thence directed to drive a power turbine 55 which drivingly connects to a power turbine shaft 57.

For purposes of the description hereinafter to follow the term "axial direction" or the like, shall mean a direction along the X—X as shown in FIG. 1, the term, "radial direction" or the like, shall mean a direction along a line perpendicular and passing through the X—X axis, the term "circumferential direction" or the like shall mean a direction along a line the locii of points of which surround the X—X axis and the term "transverse direction" or the like, shall mean a direction generally perpendicular to axis X—X.

The hot gas stream is exhausted from the engine 10 through an annular exhaust diffuser 60 defined generally between a center plug 64 and a fixed outer shroud 62 which may be a part of casing 12. An axially extending hollow cylindrical nacelle 66 surrounds casing 12 and is spaced apart therefrom so as to form an engine bay cavity 66 therebetween. Cool engine bay air is accessible to cavity 68 through inlet 69.

It will thus be appreciated that the gas turbine engine so far described is of the conventional turboshaft type wherein the power turbine shaft 57 may be connected to drive the rotor blades of a helicopter. It will also be appreciated that, although a gas turbine engine of the turboshaft type has been herein described, other types of gas turbine engines such as turbofan and turboprop engines may be suitable for use with the infrared suppression system of the present invention.

Infrared suppressor 11 disposed immediately aft of engine 10 and in mounting engagement therewith, is comprised generally of an axially extending elongated duct 70, which receives the flow of hot gases from engine 10 and serves to generally confine the flow of hot exhaust gases. Duct 70 is comprised of three stages or sections arranged sequentially one after the other in the axial direction; namely, engine transition section 72, intermediate suppressor section 74 and exhaust section 76. A pair of air scoops 77 (only one of which is partially shown in FIG. 1) opens in the forward direction and are disposed on opposing sides of transition section 72. Scoops 77 provide for the admittance of cooling ambient air into the interior of section 72 in a manner hereinafter to be described.

Figure 2:
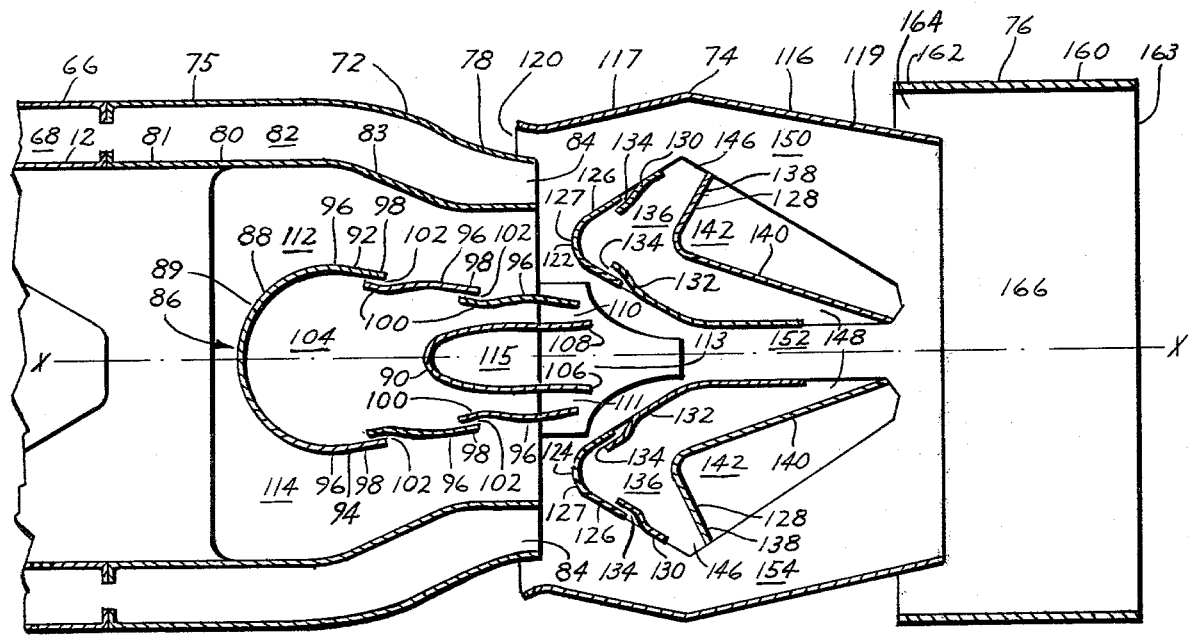
FIG. 2 depicts a cross-sectional schematic view of the suppressor comprising the present invention.

Referring now to FIGS. 2 and 3, transition section 72 includes a generally axially extending nacelle adapter 75 fixedly secured to the aft end of nacelle 66. Adapter 75 includes a necked-down generally rectangular portion 78 at its most aft end for purposes hereinafter to be described. A generally axially extending hollow open-ended transition member 80, mounted to the aft end of casing 12, is disposed within nacelle adapter 75 and is spaced therefrom so as to define therewith a circumferentially and axially extending cavity 82 adapted to receive cooling air from engine by cavity 68. The aft end of cavity 82 includes an exit 84 through which a portion of the cooling air may be discharged from cavity 82 for purposes later to be described.

Transition member 80 comprises an axially extending conical transition portion 81 at its forward end adapted to receive circular flow of hot gases from engine 10. Conical portion 81 delivers the flow to transition portion 83 comprising the aft end of transition member 80. Rectangular portion 83 is generally rectangular and includes a pair of side walls 85 and 87 and is adapted to receive flow from transition portion 81 and to exhaust the flow aftward into the next downstream section of suppressor 11.

First splitter means, in the form of a double walled splitter 86, is disposed in rectangular portion 83 and is comprised of a first generally ⊔-shaped transversely extending wall member 88. The base of ⊔-shaped member 88 comprises frontal or base portion 89 which is directly exposed to radiation of the hot metal parts of engine 10. Splitter 86 further includes a second generally ⊔-shaped transversely extending wall member 90 disposed generally within the confines wall member 88, but downstream of frontal portion 89, so as to obstruct line of sight viewing of frontal portion 89 of wall member 88 when the engine is viewed from the aft direction. A pair of transversely and axially extending stepped legs 92 and 94 extend in the aft direction from frontal or base portion 89. Each leg 92 and 94 is comprised of a plurality of transversely and axially extending segments 96, each having a downstream end 98, which overlaps the upstream end 100 of the next adjacent downstream segment 96. Overlapping in this manner provides a plurality of transversely extending cooling slots 102 for discharging cooling air along the outer surface of legs 92 and 94 to effect film cooling of legs 92 and 94.

As may be observed wall members 88 and 90 are spaced axially apart to define an elongated transversely extending flow channel 104 which extends transversely through side walls 85 and 87 of rectangular portion 83 and through adapter 75 at two opposed locations. In this manner then flow channel 104 is in communication with cooling air from the ambient environment provided by scoops 77. Additionally, wall member 90 includes a pair of legs 106 and 108 which are spaced radially inwardly of legs 94 and 92, respectively, of wall member 88. The spacing between legs 92 and 108 at their aft end define exit slot 110 while the spacing between legs 94 and 106 define an exit slot 111. Exit slots 110 and 111 extend in the transverse direction and are adapted to provide for the discharge of cooling air in channel 104 in the aft direction. Additionally, legs 106 and 108 are spaced apart from each other to define a third transversely extending exit slot 113 disposed at the aft end of legs 106 and 108. Additionally, the spacing between legs 106 and 108 upstream of exit slots 110 and 111 defines a transversely extending flow channel 115 which extends through side walls 85 and 87 of rectangular portion 83 and through adapter 75. In this manner then, flow channel 115 is in communication with ambient air.

Hot exhaust gas emerging from gas turbine engine 10 is received by transition member 80 and is split into first and second flowing gas streams by splitter 86. The first gas stream flows through a first traversely and axially extending passage 112 defined by and between leg 92 and transition member 80 while the second gas stream flows through a second transversely and axially extending passage 114 defined by and between leg 94 and transition member 80.

Ambient cooling air provided by air scoops 77 to flow channel 104 is adapted to reduce the temperature of ⊔-shaped wall member 104. More specifically, cooling air admitted to the ends of flow channel 104 which protrude through nacelle adapter 75, flows transversely toward the center of engine 10. While flowing in this manner, the cooling air contacts and cools base portion 89. Consequently, the temperature of base portion 89, which is directly exposed to radiation of the hot metal parts of engine 10, is reduced. Additionally, a portion of the cooling air flowing in channel 104 is discharged through slots 102 to form a barrier film of cooling air along legs 96. The barrier film of cooling air inhibits the hot gases flowing in passages 112 and 114 from increasing the temperature of legs 92 and 94. In this manner, cooling of splitter wall member 88, which is a secondary source of infrared radiation due to its direct exposure to the hot metal parts of the engine 10, reduces the radiation emitted and reflected by wall member 88. Additionally, by disposing wall member 90 in the manner heretofore described, line of sight viewing of a secondary source of emission, wall member 88, is obstructed when the engine is viewed from the aft direction. It should also be noted that transition member 80 which is also directly exposed to radiation from the hot metal parts of engine 10, is itself cooled by cooling air in cavity 82 and viewing of member 80 is precluded by nacelle adapter 75 and scoops 77.

It should be noted that after cooling of base portion 89, the cooling air in channel 104 is discharged through exit slots 110 and 111 for mixing purposes hereinafter to be described. Similarly cooling air flowing in channel 115 is discharged through exit 113 after cooling of wall member 90 for mixing purposes hereinafter to be described.

Referring now to FIGS. 2 & 4, intermediate suppressor section 74 is disposed immediately downstream of transition section 72 and is adapted to receive the hot exhaust gases flowing from passages 112 and 114 and exit slots 110, 111, and 113. Suppressor section 74 includes an axially and circumferentially extending generally rectangular duct 116 having an upstream inlet portion 117 adapted to overlap the necked-down portion 78 of nacelle adapter 75 to define therewith a peripheral entrance way 120 for the introduction of ambient cooling air into section 74 about its periphery. It is observed that exit 84 of cavity 82 serve to discharge engine bay cooling air into section 74 adjacent its periphery. Duct 116 further includes a slightly diverging forward portion 117 and a slightly converging portion 119.

Second splitter means in the form of a pair of double-walled splitters 122 and 124 are disposed within and extending transversely across and through duct 116. Splitter 122 is disposed on one side of the horizontal center line X—X of suppressor 11 and in axial alignment with passageway 112 while splitter 124 is disposed on the opposite side of the center line X—X and in axial alignment with passageway 114. The height of each splitter 122 and 124 is greater than the height of passages 112 and 114 respectively, so as to preclude line of sight viewing of the hot metal parts of the engine 10 through passages 112 and 114. Disposed in this manner, splitter 122 splits the first hot gas stream emerging passage 112 while splitter 124 splits the second hot gas stream emerging passage 114.

Each splitter 122 and 124 includes a generally -shaped transversely extending upstream wall member 126 and a generally ⊔-shaped transversely extending downstream wall member 128 disposed downstream of the upstream wall member to obstruct line of sight viewing of the upstream wall member when the engine is viewed from the aft direction.

Wall member 126 is constructed in much the same manner as wall member 88. That is to say, wall member 126 comprises an upstream frontal or base portion 127 from which a pair of legs 130, 132 extend in the aft direction. Legs 130 and 132 each having cooling slots 134 adapted to provide a flow of cooling air over the exterior surfaces of legs 130 and 132 in the same manner as provided with respect to splitter 86.

Wall member 128 is axially and radially spaced apart from wall member 126 so as to define therewith transversely extending ⊔-shaped flow channel 136 which extends through duct 116 so as to be in fluid communication with ambient cooling air. Additionally, axially and transversely extending legs 138 and 140 forming a portion of wall member 128 serve to partially define a transversely extending flow recess 142 which also extends through duct 116 so as to be in fluid communication with ambient cooling air. Recess 142 is open-ended; that is to say it is opened generally in the aft direction so that cooling air may be exhausted within section 74 for mixing purposes hereinafter to be described. The aft end of leg 130 of wall member 126 terminates ahead of, and is axially spaced apart from, the aft end of leg 138 of wall member 128 so as to define a transversely extending exit 146 therebetween. Likewise the aft end of leg 132 of wall member 126 terminates ahead of and is axially spaced apart from the aft end of leg 140 of wall member 128 so as to define a transversely extending exit 148 therebetween. Exits 146 and 148 serve to provide for the discharge of cool ambient air from flow channel 136.

With splitters 122 and 124 disposed in the manner heretofore described, three transversely and axially extending radially adjacent passages 150, 152 and 154 are defined in suppressor section 74. Outer duct 116 and splitter 122 serve to define passage 150 disposed therebetween. Splitters 122 and 124 serve to define passage 152 disposed therebetween. Thirdly, outer duct 116 and splitter 124 serve to define passage 154 disposed therebetween.

Hot gas flow streams exiting from passages 112 and 114 in transition section 72 impinge upon and are split by splitter 122 and 124, respectively. The stream of hot gases emerging from passage 112 is split into two additional flow streams; one of which is directed toward passage 150 and the other of which is directed toward passage 152. Similarly, the stream of hot gases emerging from passage 114 is split into two additional flow streams; one of which is directed into passage 152 and the other of which is directed toward passage 154.

Cooling air within flow channels 136 of splitters 122 and 124 serves to cool each upstream base portion 127 which is directly exposed to infrared radiation and hot gas exhaust of gas turbine engine 10 Additionally, a portion of cooling air from channel 136 is discharged through slots 134 in a direction along wall member 126 to form a barrier film of cooling air on the outside surfaces of wall member 126 for inhibiting the impinging hot gases from increasing the temperature of wall members 126. Cooling of splitter wall members 126 in this manner reduces its ability as a secondary source of radiation to emit and reflect infrared radiation.

By disposing wall members 128 in the manner heretofore described, line of sight viewing of wall members 126 is obstructed when the engine is viewed from the aft direction. Line of sight viewing of wall members 126 from the side is precluded by a pair of air scoops 158 (best viewed in FIGS. 1 and 4) attached to duct 116. Air scoops 158 cover flow channels 136 and 142 from view but provide for the admission of cooling air through a forwardly directed opening in scoops 158.

Section 76 is comprised of a generally rectangular axially extending hollow duct 160 having a forward inlet portion 162 and an exhaust exit 163. Inlet portion 162 is in overlapping spaced-apart relationship with coverging portion 119 of duct 116. A peripheral circumferentially extending passage 164 is defined between portion 162 and 119 at the aforementioned overlap. Passage 164 communicates chamber 166, defined by and within duct 160, with ambient cooling air circumscribing suppressor 11.

It should be pointed out that in some instances it may be desirable to apply a high emissivity coating to the internal periphery of ducts 116 and 160 and the outer surfaces of splitters 86, 122, and 124. This coating, which should have good anti-erosion characteristics, will reduce the reflection of radiation from the inner surfaces of ducts 116 and 160.

Heretofore, the reduction of the engine infrared signature associated with the hot turbine parts has been described. Attention is now directed toward those features of this invention which reduce the infrared signature of the exhaust gases of engine 10. This is accomplished by mixing the hot exhaust gases with cooler air prior to exhaustion to the atmosphere. One of the factors important in achieving effective plume suppression is uniformity of mixing. Even small localized hot spots in the plume will significantly increase its total infrared signature. Hence mixing between the hot gas stream and the cooling air must be uniform. The present invention achieves these objectives by providing for the introduction of a substantial amount of cooling air into the suppressor at a number of axially spaced locations.

Referring again to FIG. 2, it may be observed that mixing is accomplished in a number of stages, or in other words at a number of axially spaced locations along the center line of the suppressor 11. Generally, the present invention comprises a premixing stage, an intermediate mixing stage and a final mixing stage. Premixing is accomplished at a first mixing plane or interface disposed at a first axial location at the aft end splitter 86 in transition section 72 and generally at the upstream end of section 74. At the first mixing interface, the present invention provides for the introduction of cooling air into the upstream end of intermediate section 74 both at its periphery and transversely across its interior. More specifically, ambient cooling air is admitted into section 74 about its periphery through entrance way or slot 120 and engine bay cooling air is admitted through exit 84 of cavity 82. This cooling air mixes with that portion of the hot gas stream which has been directed by splitters 122 and 124 toward passages 150 and 154.

In addition to peripheral premixing at the periphery of the first interface, the present invention provides for interior premixing of the hot gas stream entirely across the interior of section 74 proximate its upstream end. Interior premixing at the first interface is accomplished by the present invention which provides for the introduction of cooling air into section 74 transversely across its interior at a location proximate the X—X axis. More specifically, cooling air is admitted to section 74 at its interior through transversely extending exit 113 associated with cavity 115 and through transversely extending exits 110 and 111 associated with cavity 104. The cooling air introduced in this manner mixes with those portions of the hot gas stream which have been directed by splitters 122 and 124 towards passage 152.

A second or intermediate stage of mixing of the gas stream with cooling air is also accomplished at a second mixing plane or interface at a location disposed downstream of the axial location of the first mixing interface. Both peripheral and interior mixing are provided at the second mixing plane which is disposed proximate splitters 122 and 124 in Section 74. More specifically, open-ended recesses 142 of splitters 122 and 124 are adapted to discharge a large quantity of cooling air toward passages 150 and 154 respectively. Additionally, a portion of the cooling air in flow channels 136 is discharged toward passages 150 and 154 through exit slots 146. The direction of flow of a portion of this cooling air includes a component of flow substantially in a non-axial direction and is adapted to mix with the already premixed gas flow streams in passages 150 and 154 which have again assumed a substantially parallel flow. Consequently the premixed streams in passages 150 and 154 collide with cooling air exhausted from recesses 142 and hence peripheral mixing is further enhanced.

In addition to mixing at the periphery of the second mixing interface, the present invention provides for mixing entirely across the interior of section 74 at the second interface. Interior mixing is accomplished by admitting additional cooling air to the interior of section 74 through transversely extending exit slots 148 associated with cavities 136 of splitters 122 and 124. This cooling air mixes with the premixed gas stream flowing in passage 152.

The present invention includes a final mixing stage generally at a third mixing interface disposed at the inlet portion 162. Mixing at the third interface is accomplished at the periphery of duct 160 by the admission of ambient cooling air into chamber 166 through passages 164. This cooling air mixes with the gas which is entering section 76 from section 74. Suppressor 11 is well adapted to achieve the objects herein before stated and to overcome many of the problems associated with prior art devices. A substantial reduction in infrared radiation emitted to the atmosphere is accomplished through the provision of staged splitters disposed at spaced apart axial locations and cooperating to obstruct the line of sight viewing of hot engine parts. The use of axially staged splitters enhances mixing of cooling air with the hot exhaust gases. The splitters are of double-walled construction such that the line of sight to the upstream wall, exposed directly to radiation and hot gas exhaust of the engine, is obstructed when the engine is viewed from the aft direction. In this regard, it should be observed that secondary sources of radiation, are shielded from external view. The double-walled construction also permits the exposed splitter wall to be air cooled thus lowering its temperature and correspondingly reducing the level of emitted radiation.

The present invention provides for the introduction of cooling air for mixing purposes at discrete mixing planes disposed at spaced apart axial locations. At each mixing plane, cooling air is introduced about the periphery of the suppressor duct and entirely across its interior. The splitters disposed at each plane include means for discharging cooling air into the interior of the duct. The present invention is well adapted to introduce cooling air into the suppressor in quantities approximating 0.8 to 1.6 times the quantity of hot gas introduced into the suppressor.

While the preferred embodiment of my invention has been fully described in order to fully explain its principles, it is understood that various modifications or alterations or other embodiments may be utilized without departing from the scope of the appended claims. By way of example the use of radially extending splitters in lieu of transversely extending splitters would come within the scope of appended claims.

I claim:

1. In an apparatus for suppressing infrared radiation emitted from hot metal parts at the aft end of a gas turbine engine and from the stream of hot exhaust gases flowing therefrom during operation of the engine, the invention comprising:

duct means for receiving the stream of hot exhaust gases from said engine, said duct means adapted to generally confine said exhaust gases to flow through said duct;

first splitter means disposed within said duct means for splitting said gas stream into first and second flowing gas streams; and second splitter means disposed within said duct means downstream of said first splitter means for splitting each of said first and second gas streams, said first and second splitter means cooperating to obstruct the line of sight viewing of said hot metal parts when said engine is viewed from the aft direction.

2. The invention set forth in claim 1 wherein said first splitter means includes a first wall member exposed to infrared radiation emitted by said hot metal parts and a second wall member disposed downstream of at least a portion of said first wall member and spaced apart therefrom, said second wall member obstructing the line of sight viewing of said first wall member when said engine is viewed from the aft direction.

3. The invention as set forth in claim 2 wherein the spacing between said first and second wall members defines a first flow channel adapted to provide cooling of said first wall member with cooling air.

4. The invention as set forth in claim 3 wherein said second splitter means includes an upstream wall member exposed to infrared radiation emitted by said hot metal parts and a downstream wall member disposed downstream of said upstream wall member and spaced apart therefrom, said downstream wall member obstructing the line of sight to said upstream wall member when said engine is viewed from the aft direction.

5. The invention as set forth in claim 4 wherein the spacing between said upstream and downstream wall members defines a second flow channel adapted to provide cooling of said upstream wall member with cooling air.

6. The invention as set forth in claim 1 wherein said first and second splitter means each extend transversely across said duct generally parallel to a plane passing through the axial center line of said engine.

7. The invention as set forth in claim 1 wherein said first and second splitter means each extend in a direction generally radial to the axial center line of said engine.

8. In an apparatus for suppressing infrared radiation emitted from hot metal parts at the aft end of a gas turbine engine and from the stream of hot exhaust gases flowing therefrom during operation of the engine, the invention comprising:

duct means for receiving the stream of hot exhaust gases from said engine, said duct means adapted to generally confine said exhaust gases to flow through said duct;

first splitter means disposed within said duct means for splitting said gas stream into first and second gas streams; and second splitter means disposed within said duct means downstream of said first splitter means for splitting each of said first and second gas streams, said first and second splitter means cooperating to obstruct the line of sight to said hot metal parts when said engine is viewed from the aft direction; and mixing means for mixing said hot exhaust gases received from said engine with cooling air to reduce the temperature of the gases exiting said suppressor.

9. The invention as set forth in claim 8 wherein said mixing means provides for premixing said air with said first and second gas streams at a first mixing interface disposed at a first axial location.

10. The invention as set forth in claim 9 wherein said mixing means provides for an additional mixing of said air with said first and second gas streams at a second mixing interface disposed at a second axial location downstream of said first axial location.

11. In an apparatus for suppressing infrared radiation emitted from the hot metal parts at the aft end of a gas turbine engine and from the stream of hot exhaust gases flowing therefrom during operation of the engine, the invention comprising:

duct means for receiving the stream of hot exhaust gases from said engine, said duct means adapted to generally confine said exhaust gases to flow through said duct;

a first splitter disposed within said duct, said splitter splitting hot gas stream into first and second gas streams and including a first wall member exposed to infrared radiation emitted by said hot metal parts, a second wall member spaced apart from and disposed downstream of said first wall member, said spacing between said first and second wall members defining a first flow channel; and a pair of second splitters disposed within said duct downstream of said first splitter, said pair of second splitters splitting each of said first and second gas streams and one of said pair including an upstream wall member exposed to infrared radiation emitted by said hot metal parts, a downstream wall member spaced apart and disposed downstream of said upstream wall member, said spacing between said upstream and downstream wall members defining a second flow channel, said first and second splitters cooperating to obstruct the line of sight viewing of said hot metal parts when said engine is viewed from said aft direction.

12. The invention as set forth in claim 11 wherein said second wall member is disposed downstream of said first wall member to obstruct the line of sight viewing of said first wall member when said engine is viewed from the aft direction.

13. The invention as set forth in claim 12 wherein said downstream wall member obstructs the line of sight viewing of said upstream wall member when said engine is viewed from the aft direction.

14. The invention as set forth in claim 11 further comprising:

mixing means for mixing said hot exhaust gases received from said engine with cooling air to reduce the temperature of said hot exhaust gases exiting said engine, said cooling air being introduced into said first and second flow channels for cooling of said first and upstream wall members prior to ejection of said cooling air into said hot gas stream.

15. In an apparatus for suppressing infrared radiation emitted from hot metal parts at the aft end of a gas turbine engine and from the stream of hot exhaust gases flowing therefrom during operation of the engine, the invention comprising:

duct means for receiving the stream of hot exhaust gases from said engine, said duct means adapted to generally confine said exhaust gases to flow through said duct;

first splitter means disposed within said duct means to splitting said gas stream into first and second flowing gas streams; and second splitter means disposed within said duct means downstream of said first splitter means for splitting said gas stream, said first and second splitter means obstructing the line of sight viewing of said hot metal parts when said engine is viewed from the aft direction.

* * * * *

UNITED STATES PATENT AND TRADEMARK OFFICE
CERTIFICATE OF CORRECTION

PATENT NO. : 4,295,332
DATED : October 20, 1981
INVENTOR(S) : William Steyer and Robert J. Duffy It is certified that error appears in the above-identified patent and that said Letters Patent are hereby corrected as shown below:

Column 12, line 3, delete the word "to" and insert in place thereof the word --for--.

*Signed and Sealed this*

*Twenty-ninth* Day of *December 1981*

[SEAL]

*Attest:*

*Attesting Officer*

GERALD J. MOSSINGHOFF

*Commissioner of Patents and Trademarks*